July 13, 1965　　J. CALDWELL ETAL　　3,194,957
ELECTRIC LIGHTING APPARATUS

Filed Jan. 4, 1961　　10 Sheets-Sheet 1

INVENTORS
JAMES CALDWELL
CHARLES HUBERT HODGSON
JOHN THOMAS HOPWOOD
BY John Howard Pearson
ATTORNEY

INVENTORS
JAMES CALDWELL
CHARLES HUBERT HODGSON
JOHN THOMAS HOPWOOD
BY
ATTORNEY

July 13, 1965  J. CALDWELL ETAL  3,194,957
ELECTRIC LIGHTING APPARATUS
Filed Jan. 4, 1961  10 Sheets-Sheet 4

FIG. 14.

INVENTORS
JOHN CALDWELL
CHARLES HUBERT HODGSON
JOHN THOMAS HOPWOOD
BY
John Howard Pearson ATTORNEY

July 13, 1965 J. CALDWELL ETAL 3,194,957
ELECTRIC LIGHTING APPARATUS
Filed Jan. 4, 1961 10 Sheets-Sheet 9

INVENTORS
JAMES CALDWELL
CHARLES HUBERT HODGSON
JOHN THOMAS HOPWOOD
BY
John Howard Pearson ATTORNEY 3,194,957
ELECTRIC LIGHTING APPARATUS
James Caldwell, Olive Cottage, Hayes Lane, Timperley, Cheshire, England; Charles Hubert Hodgson, Oak Bungalow, Longhurst Lane, Mellor, Marple, England; and John Thomas Hopwood, 7 Dartford Road, Urmston, Manchester, England
Filed Jan. 4, 1961, Ser. No. 80,650
9 Claims. (Cl. 240—11.4)

This invention relates to electric lighting apparatus using the so-called ballast chokes with discharge lamps, for example mercury-vapour lamps, sodium-vapour lamps and the like and, more especially, with the recently-introduced mercury-vapour fluorescent lamp bulbs. The invention is applicable to lighting apparatus whether for indoor or outdoor use, and whether flame-proof or non-flame-proof, whether for fluorescent or non-fluorescent discharge lighting and whether the lamp is of bulb form or is a tube.

Hitherto, lighting fittings having lamps of the types above mentioned have usually had the chokes housed in separate fittings, i.e. separate from the lamp fittings themselves, and this has entailed additional cost of manufacture and a duplication of assembly work. One reason for such arrangement of separate housings for the choke and the lamp has been that, to prevent or suppress noise in the chokes and to exclude moisture from them, the chokes have been enveloped in a bituminous compound, but as the melting point of such compound is too low to allow of a safe proximity to the lamp it has been necessary for the choke to be thermally isolated from the lamp. The use of said bituminous compound has also called for the provision of a rigid external casing for the choke, usually a metal casing, which has increased the weight of the device.

Apart from the question of the thermal immunity of the chokes, the forms of choke hitherto adopted in connection with the said lighting fittings have been difficult to incorporate in a lamp fitting and, in any event, if so incorporated they would necessitate the fitting being of an asymmetrical, unattractive appearance. This is because the emphasis on using a minimum of materials in the choke has promoted an almost universal use of a cubic or similar parallelepiped form for the chokes, but such a block-shaped device does not conform to the generally annular form of a lighting fitting.

Hitherto, also, the weight of the known fittings has made it difficult for an electrician to hold them when installing and/or maintaining the lighting, the fittings in any event being at heights imposing limitations on the movements of the electrician handling them. Also, when the fittings have been used in explosive and other hazardous zones requiring flame-proof fittings, it has been proposed either to enclose the lamp only in the actual flame-proof fitting, and to situate the choke and a power-factor condenser elsewhere in a safer zone, or to use a single flame-proof fitting made sufficiently large. The separate mounting of the choke and condenser away from the light fitting, has required the use of undue amounts of space which sometimes detract from useful factory or storage space, and has necessitated additional wire or cable and conduit with the consequent expense.

Objects of the present invention are to eliminate the above-named difficulties and restrictions, and to provide cheaper and more reliable forms of choke which can easily be assembled into a lamp fitting whilst preserving a symmetrical annular form, and without noticeably increasing the size of the fitting. In particular, the invention achieves these objects without imposing on the electrician any undue physical strain when installing the fittings, the improved chokes being of relatively light-weight in comparison with their rating and allowing a sectional installation of the fittings as distinct from a total, all-at-once installation.

According to this invention, a choke suitable for a lighting fitting using a lamp of the kind described comprises at least one core and at least one inductor assembled into annular form so as to fit around the axis of the lamp, for example around the lamp holder or lamp stem, or at a point above the lamp holder, within an annular part of the fitting, the said assembly comprising the choke preferably being formed as an integral unit. The choke will be shielded by a heat-resistant cover or enclosure preferably in the form of an encapsulation of thermo setting resin material such as epoxy resin, polyester resin, or an encapsulation of cementitious material, with or without an external metal enclosure. This annular choke may be of regular circular form, or may be of elliptical form or of other ring-shaped form, dependent on the shape of the lamp and fitting with which it is to be used, and it may be of any suitable cross-sectional shape, some examples of which are discussed below.

The improved choke may comprise a core as an inductor with one or more windings thereon and encapsulated in heat resistant material but preferably it is a wound core with a laminated inductor assembled thereon.

In the preferred form of the invention, therefore, the improved choke comprises an internal coil of annular form, and an external laminated inductor around such coil, the whole being encased in a moulded shield. Usually the assembly will be embedded in a moulded casing of a heat-resisting material e.g. in a potting jig. In all cases suitable tappings will be provided where desired, extending from selected points of a single winding or selected ones of a number of separate windings.

According to the invention also that part of the lighting fitting which houses the lamp holder is of circular, elliptical or like ring section and houses the annular choke together with a condenser for power factor correction if required.

In the case of flame-proof fittings, the said annular choke (and the condenser if present) is housed in an annular compartment of the lighting fitting partitioned off from the lamp housing itself, the partition in some cases extending up into the centre of said annular choke and the lamp holder then being accommodated within such upwardly-extending part.

According to a further feature of the invention, the improved annular choke has its encapsulation and/or container shaped so as to constitute an adaptor between a terminal block in the upper part of the lighting fitting and a shade or reflector (or both) at the lower part of such fitting. With such an arrangement the electrician installing the fitting is relieved of the weight of the choke and the shade etc. whilst mounting and wiring up the terminal block, whereafter he may attach the choke to the assembled parts of the fitting, insert the lamp, and finally connect the shade or reflector to the choke itself. Such terminal block and the upper part of a housing for the choke (and condenser if present) may be adapted for independent attachment to the ceiling or other mounting, and electrical connection with the choke and condenser and lamp being made automatically or otherwise on the assembly on to such upper housing part of a lower housing part which carries such components (with or without a reflector), and the electrical connection being broken on or before separation of the housing parts.

The arrangement of terminals on the terminal block will usually be such that, when necessary, "looping-in" may be effected from cables running on to succeeding fittings, and the arrangement of plug sockets on such block will be such that the said condenser (if present) may be connected either across the incoming mains, thus effecting a power factor correction all the time that the mains are live, or so as to be put into circuit only when the light is switched on.

With an arrangement including all the features set out above, the choke and condenser are effectively isolated from any hazardous atmosphere, and, being included within the lighting fitting itself, unnecessary cabling and the duplication of assembly work is avoided. Furthermore, in the event of a defect arising in the electrical components (e.g. choke or condenser) of the fitting, the lower part of the housing may be removed quickly and easily and another one put in its place for immediate use, leaving the defective component free for inspection and repair at leisure. This also avoids any necessity for in situ testing and repair and therefore makes the fittings especially suitable in places with a high fixed layout.

The improved two-part housings also offer a further advantage in that there may be interchangeable lower parts representing various types of lighting arrangements all of which are adapted for standardised connection to a common upper part. This permits a user to change the type of lighting in or around a building to suit revised lighting requirements of manufacturers, without the necessity of having to install new fittings.

Various embodiments of the invention are illustrated in the accompanying drawings wherein.

Referring now to FIGS. 1–13, forms of choke are shown which include a coil 1 of annular form the windings of which lie around the axis of the annulus, and on this coil are a plurality of planar, slotted laminations 2 of magnetic material. These laminations are passed on to the coil from opposite sides, with insulating dielectric material between their abutting ends and between them and the coil. The whole then has a moulded-on encapsulation 3 of a heat-resisting resin or the like.

Figure 1:
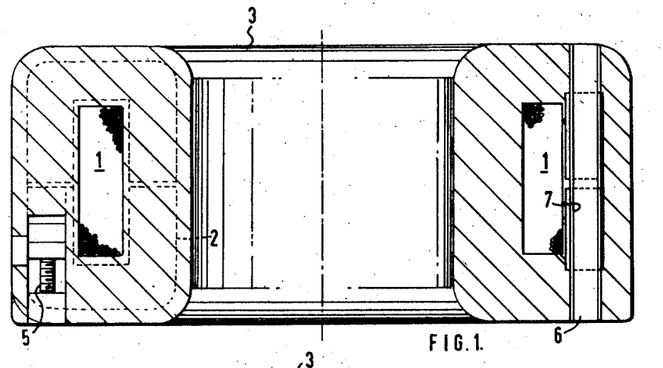
FIG. 1 is a diametral cross section through a choke having a wound core and laminated inductors.
Figure 2:
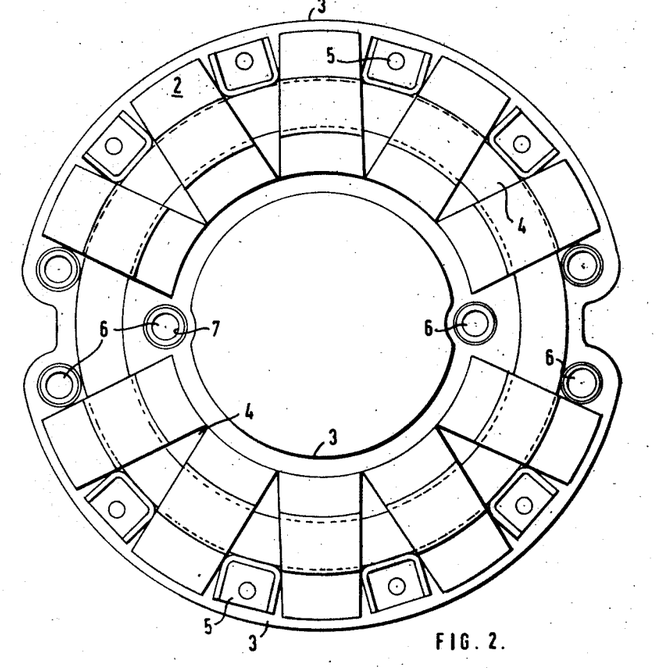
FIG. 2 is a plan of the choke shown in FIG. 1.

There is shown in FIGS. 1 and 2 an arrangement in which U-shaped metal plates 2 are in groups, see FIG. 2, leaving V-shaped spaces 4 between them, the whole being then enclosed in the moulding of resin or other heat-resisting material. The external shape follows the contour of the laminations at the V spaces 4, and provision is made as shown at 5 for tappings from the annular winding 1. Furthermore, as shown in FIG. 2 there are through holes 6 in parts of the moulding by which the choke may be secured within a lighting fitting or elsewhere according to its place of use. Such holes are lined with more rigid bushings 7.

Figure 3:
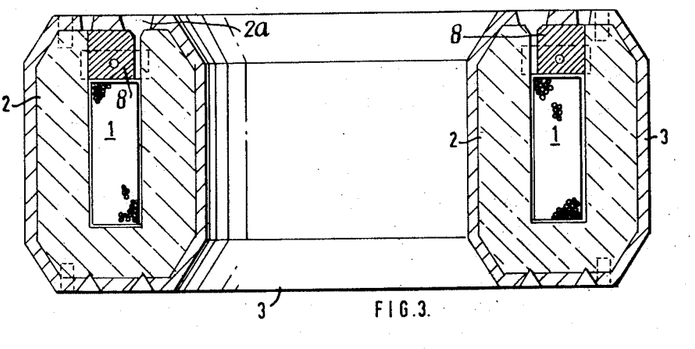
FIGS. 3 and 4 are views corresponding to FIG. 1, showing two other forms of annular choke.
Figure 4:
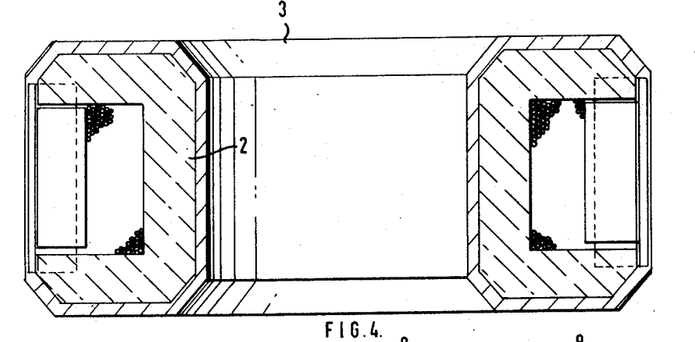
Figures 5, 6:
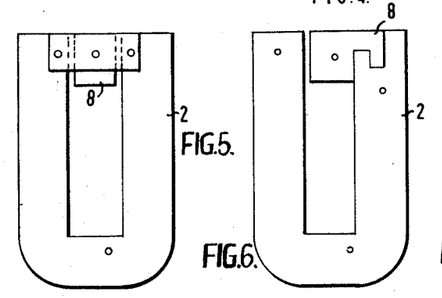
FIGS. 5–13 are side views of laminations of different shapes for annular chokes of differently-shaped cross sections.
Figure 7:
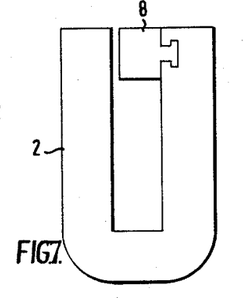
Figures 8, 9:
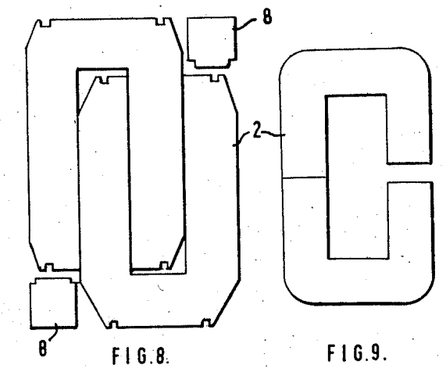
Figure 10:
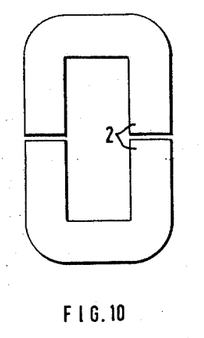
Figures 11, 12, 13:
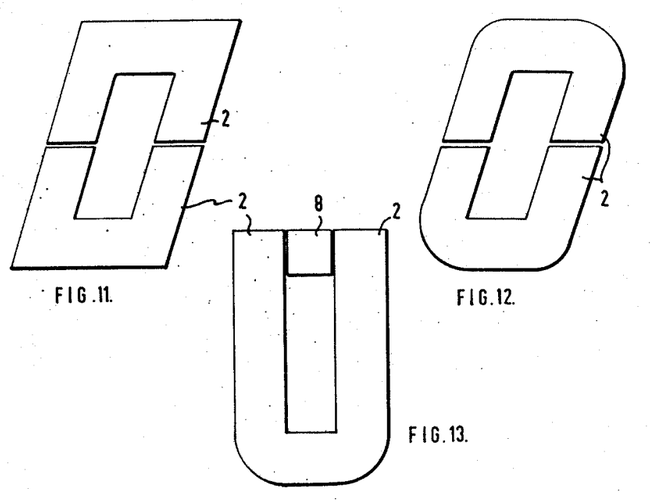

Referring now to FIGS. 3 and 4, there is shown an arrangement in which C-shaped laminations 2 are provided and the gap 2a in these is adapted to be partly closed by a filling element 8 by way of increasing the reluctance of the inductor. FIG. 4 shows a modification of this arrangement in which the gap in the C-shaped laminations is at the outer periphery of the choke.

FIGS. 5 to 13 illustrate diagrammatically various profiles for the laminations 2 of the inductor, these varying inter alia according to the shape of the annular space into which the choke is to be placed. Some of these show the use of the fillers 8 and others not, the filler plate elements of FIGURES 5, 6 and 7 being interengaged with the C-shaped plates by tongues and grooves.

Figure 14:
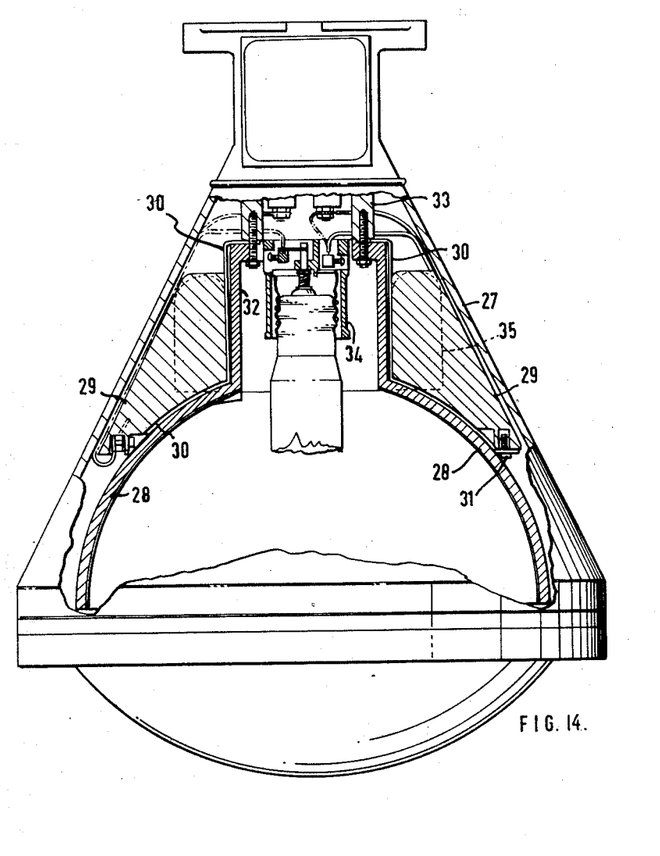
FIGS. 14–21 are sectional elevations of lighting fittings having examples of the improved chokes therein.

Referring now to FIG. 14, there is shown in half sectional elevation one adaptation of the improved choke to an industrial lighting fitting. The fitting has an outer shell or casing 27 and an interior reflector 28. As will be seen at 29, the cross-sectional shape of the choke is such as to fill the maximum space between the shell and reflector. The choke is carried by a saddle member 30, the lower end of which is connected by screws 31 to the choke and the upper end of which is clamped between the reflector stem 32 and the terminal block 33. The lamp holder 34 is therefore surrounded by this choke, and all the components are accommodated without any change from a normal external shape of the fitting itself. Suitable voltage tappings will be provided as required for electrical connection with the terminal block. Of course other cross-sectional shapes of choke may be used in this fitting, one of these being indicated in broken lines at 35.

Figure 15:
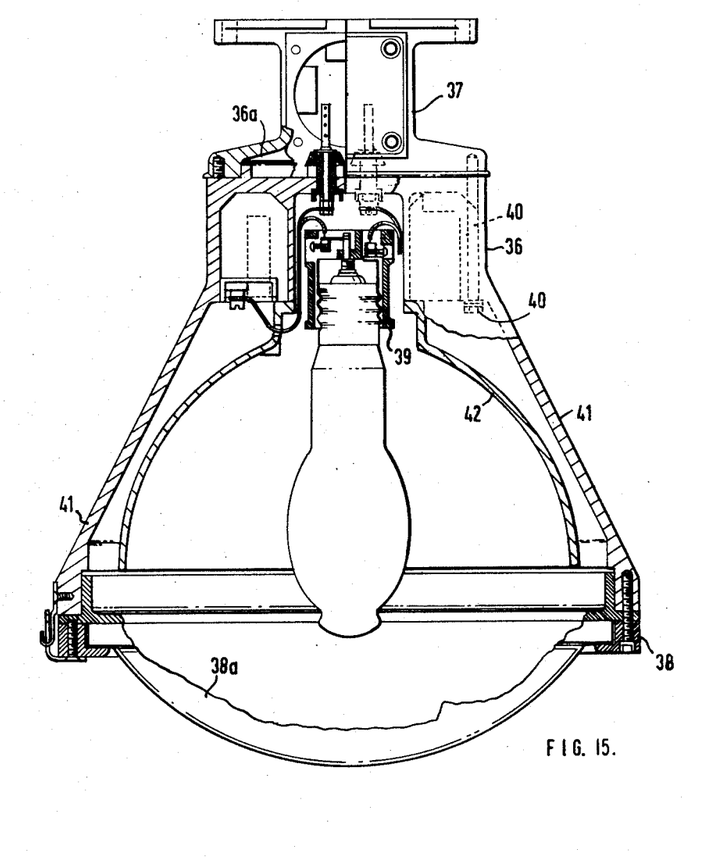

FIG. 15 shows a further feature of the invention in which the casing or encapsulation 36 of the improved choke is used as an adaptor between a terminal block 37 and a shade ring or bezel 38. In this case, the terminal block 37 is of known form adapted for attachment to the underside of a ceiling, for example, and having the usual openings to receive conduits from any direction, and the lampholder 39 is carried co-axially therein. The encapsulation 36 of the choke has an upper annular flange 36a to fit into a recess in the underside of said terminal block, and it is bolted up against the block by bolts 40. This encapsulation has a conical flange or skirt 41 the lower part of which is adapted to receive the clamping ring 38 for a glass shade 38a in known manner.

In this form of the invention therefore, when installing a lighting circuit the electrician primarily has only the weight of the terminal block 37 to contend with, and can make all his connections before attaching the choke thereto. Moreover, when fixing the choke in position he has only the weight of the choke itself and the skirt 41 to contend with as the ring 38 and glass 38a, as also the reflector 42 may be fitted to the choke in a final assembly operation.

Figure 16:
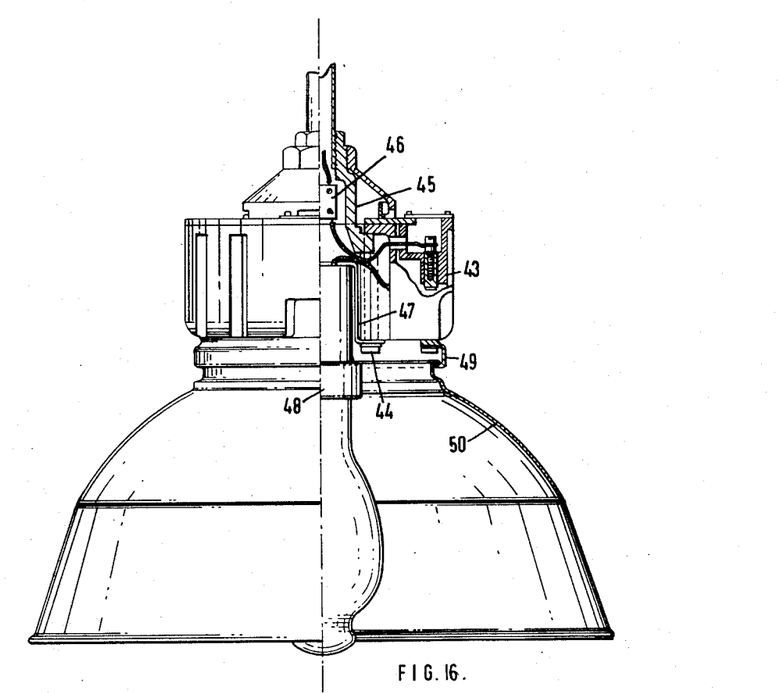

FIG. 16 shows an arrangement similar in some respects to that of FIG. 14 in that the choke serves as an adaptor for the shade. In this case the choke 43 is connected by bolts 44 to the part 45 of the lighting fitting, the part 45 enclosing a terminal block 46. Such bolts, or supplementary bolts, secure a metal strap 47 which carries the lampholder 48. Attached to the underside of the choke is a shade ring 49 which is adapted to receive and hold the reflector shade 50 in any known manner.

Figure 17:
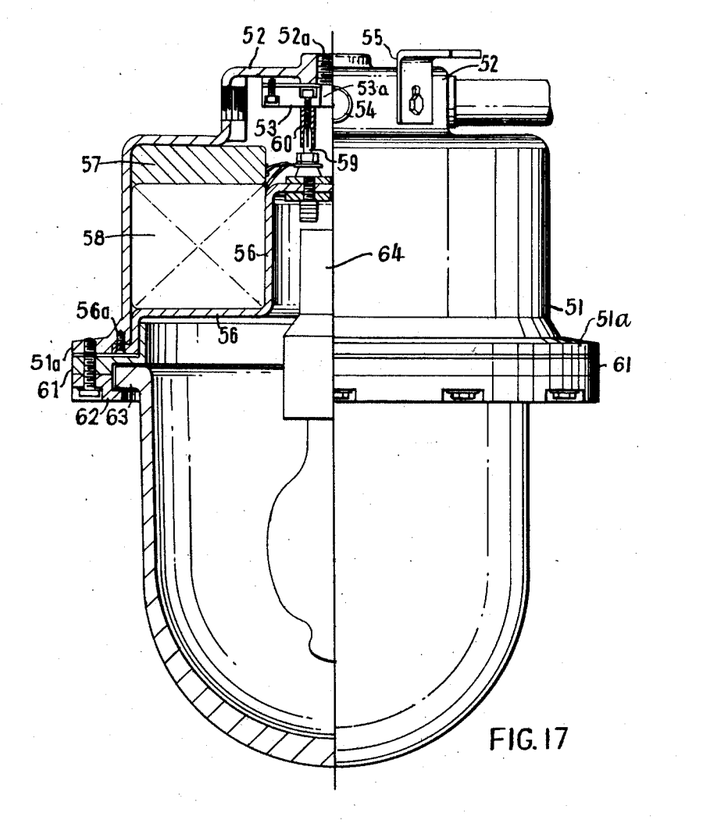

Referring now to FIG. 17 which shows an industrial lighting fitting incorporating an annular choke, there is an upper housing part in the form of an open-bottomed cylinder 51 having a smaller cylindrical extension 52 on its top wall, within which latter is a porcelain or like insulated terminal block 53 of circular form. Said extension 52 is adapted at 52a for attachment to the lower end of a suspension unit or to a ceiling or the like. It is formed with four conduit or cable entries 54 in its peripheral wall, at 90° to each other.

The insulated terminal block 53 also has a central hole 53a to allow wires from the top entry hole 52a to pass inside the fitting when necessary. Between the said cable or conduit entries 54 are screwed holes whereby mounting to a ceiling or joist can be arranged for by the use of angle, saddle or cruciform external fixing brackets 55, each having elongated vertical fixing holes to allow adjustment to compensate for level inaccuracies in the ceiling or joist surface.

There is also an inner, stepped hat-shaped plate or disc 56 within said open-bottomed cylinder 51, defining an annular space of rectangular cross section between itself and the cylinder. In this space are housed a power-corrective condenser 57 and an annular choke 58 and these are wired to plug points 59 mounted on the crown part of said plate 56 so as to enter the complemental sockets 60 on the said terminal block.

The outer edge of said hat-shaped plate 56 (which plate may also comprise or carry a reflector) is rabbeted into the lower edge of the cylindrical housing part 51 and held therein by screws 56a. Attached to an outer flange 51a of this housing part 51 is an L-sectioned ring 61 between which and a clamping ring 62 is held the peripheral flange 63 of a glass or other enclosure, for example a dispersive deep well lamp glass. All joints, excluding cable entries, consist of a gasketed horizontal flange together with a vertical flame-proof gap, thus offering complete sealing from external moisture together with safety from hazardous conditions.

The two parts of the housing may be connected together by a chain or other flexible member so that the lower one may hang free during maintenance.

The lamp holder 64 is mounted in the crown portion of the said hat-shaped disc 56 and therefore lies partly within the annulus of the choke 58.

Figures 18, 19:
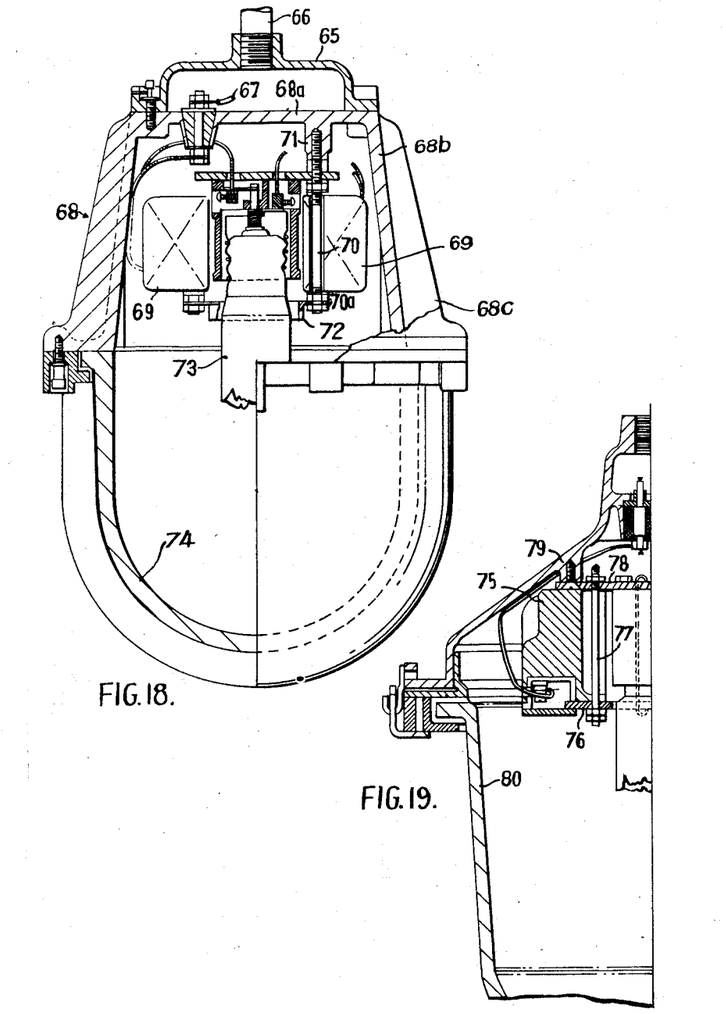

Referring now to FIG. 18, there is at the top of the fitting a suspension member 65 adapted for connection to a depending tube 66 which in practice would be suspended from a ceiling or the like in any known manner. The electrical leads enter through the said tube the end 67 of one lead being shown. Connected immediately below the said suspension member 65 is the upper part 68 of the lighting fitting and this comprises an inverted cup shaped member having a top wall 68a and outwardly tapering side walls 68b with a peripheral outer flange at the lower end. The tapering walls 68b are strengthened by radial fins or webs 68c. Within this upper enclosure member 68 is carried the annular choke 69 which is supported on screwed studs 70 entering bosses 71 formed on the said top wall 68a, the choke being retained on such studs 70 by the nuts 70a which, at the same time, support a guide member 72 surrounding the neck 73 of the lamp. Attached to the lower edge of the upper housing part 68 is a shade or globe 74, which comprises the lower part of the lamp housing, the two parts 68 and 74 being connected together in a flame-proof manner.

Referring now to FIG. 19, the choke 75 is clamped by plate 76 and studs 77 against a plate or disc 78 which is connected to the upper part 79 of the lamp housing of which the lower part is constituted by the shade or globe 80.

Figures 20, 21:
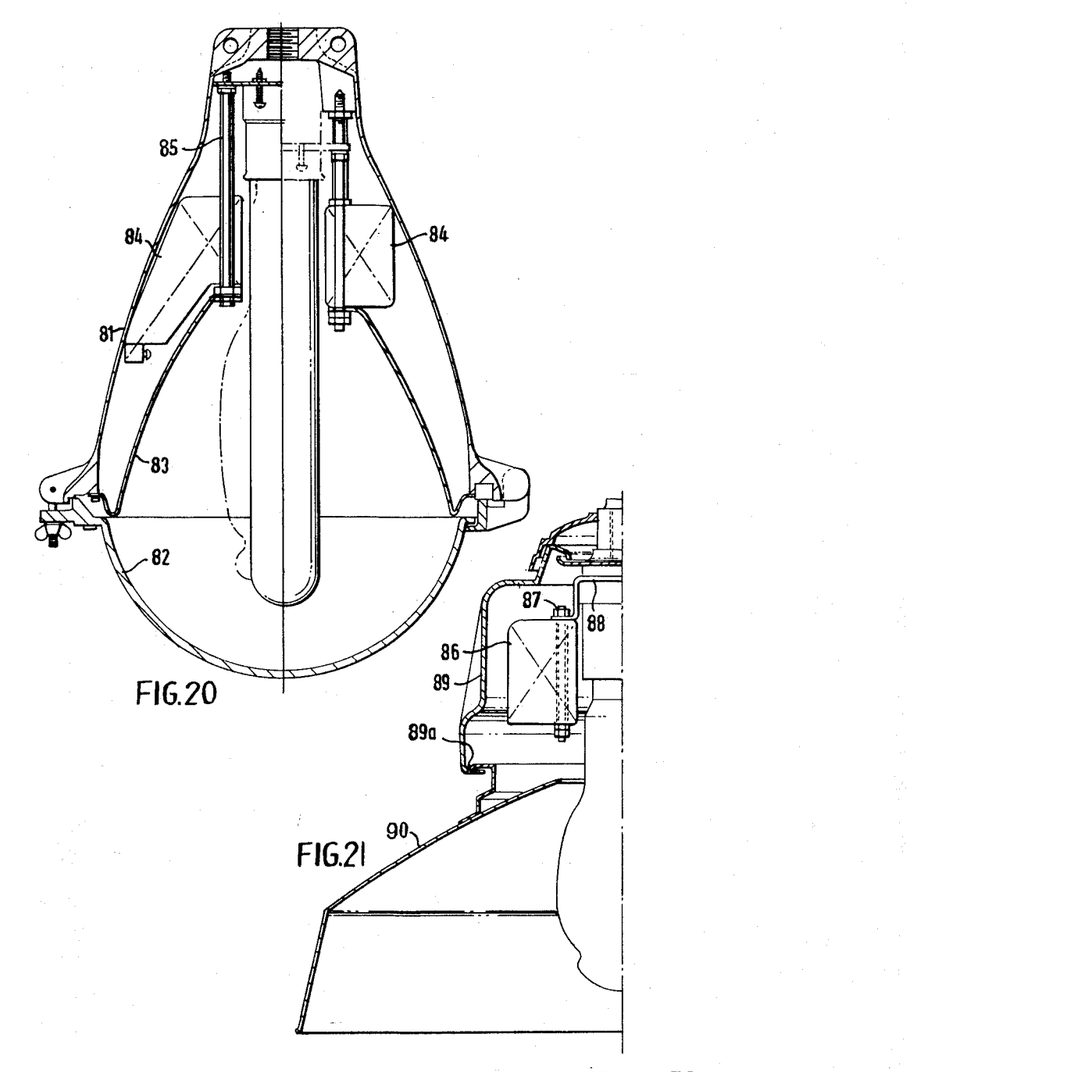

Referring now to FIG. 20, the lighting fitting comprises upper and lower parts 81, 82, the former including a reflector 83. Between this reflector 83 and the upper part 81 of the fitting is the choke 84 which is suspended on the bolts or studs 85 which carry the reflector. In the left hand half of the figure the choke is shaped so as to have a larger cross-sectional area than is possible with the shape of choke shown in the right hand half of the figure.

Referring to FIG. 21, the annular choke 86 is suspended by bolts 87 from a strap or disc 88 carried by the lamp holder structure. This choke is surrounded by the shroud or housing 89, on a slotted flange 89a of which a reflector 90 is suspended.

Figure 22:
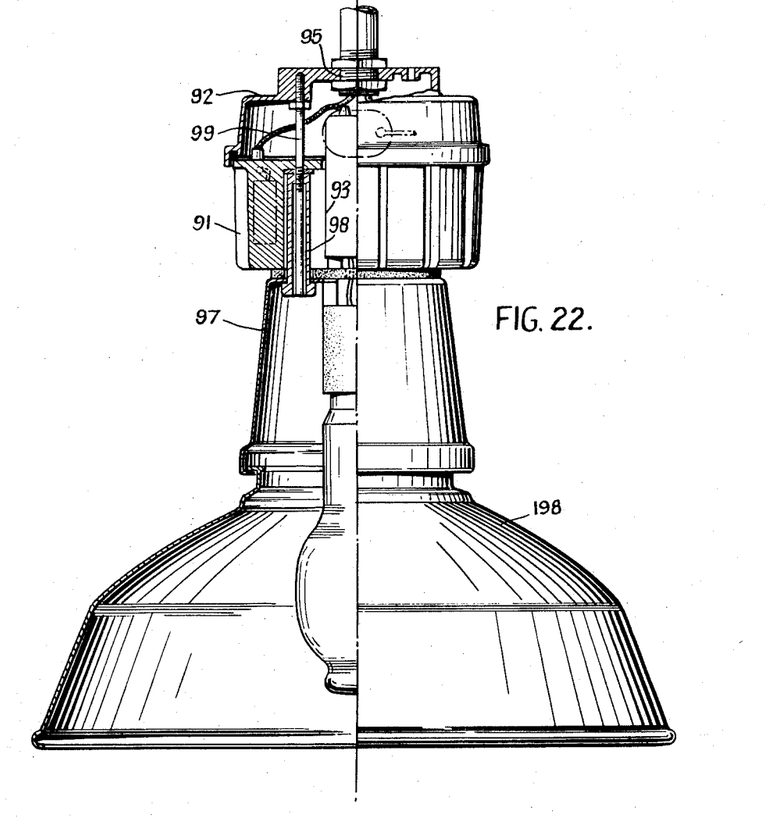
FIG. 22 is a half-sectional elevation of a further form of the improved lighting fittings.

Finally, referring to FIG. 22 the annular choke is contained within the moulding 91 above which is a cap 92 providing a space for wiring and terminals and for a power factor condenser 93. This last may lie within the central aperture in the moulding 91. For other sizes of condensers and to suit other temperature conditions a cap of greater height than the cap 92 may be used. The cap 92 has a central inlet 95 for a suspension conduit.

Below the moulding 91 is a gallery 97 to carry a dispersive or high bay parabolic shade or deflector 198, or some other types of reflector may be provided. The gallery 97 is held in position by tubular bolts 98 passing up within the moulding 91 and screwing on to the threaded part of studs 99 depending from the cap 92.

What we claim is:

1. In a symmetrical, annular, electric lighting fitting the combination of
    terminal block means adapted to be affixed to a support;
    a lamp holder in said fitting, electrically connected to said terminal block means;
    an electric discharge lamp bulb detachably mounted in said lamp holder, said lamp, lamp holder and terminal block means having a common longitudinal axis;
    an annular upper housing associated with said terminal block means, said housing encircling said common axis at a spaced lateral distance therefrom, proximate said lamp holder, and defining an annular space therearound for receiving a choke;
    an annular choke electrically connected to said lamp holder, said choke having a plurality of multi-section, co-planar, plates defining an inner cylindrical wall encircling said common axis at a spaced distance therefrom and being fitted in said annular space;
    an annular heat resistant encapsulation in intimate contact with the entire exterior of said choke, said encapsulation including an integral inner, cylindrical wall covering the said inner wall of said choke and said encapsulated choke having at least two holes therein for detachably affixing the same to said terminal block means.

2. An electric light fitting as specified in claim 1 plus:
    an inner, stepped plate having a portion extending up into the centre of said choke and forming an annular compartment of rectangular cross section with said upper housing for closely fitting said choke, said plate having a lower flange rabbetted into the lower edge of said housing and forming a partition between said compartment and the remainder of said fitting.

3. An electric lighting fitting as specified in claim 1 wherein said housing is of inverted cup shape and said fitting includes a shade of cup shape forming a lower housing and means for detachably sealing the meeting edges of said housings whereby the interior of said fitting is hermetically sealed and flame proof.

4. An electric lighting fitting as specified in claim 1 wherein
    said choke includes an annular coil of an insulated conductor, the axis of said coil being co-axial with said common longitudinal axis,
    said multi-section, co-planar plates each consist of a pair of flat, U-shaped plates extending in a common flat plane parallel to the said axis of said coil, said U-shaped plates having spaced apart abutting ends forming an air gap, in cooperation with the other multi-section plates of said choke,
    and said choke includes rigid bushings lining said holes.

5. An electric lighting fitting as specified in claim 1, wherein
    said choke includes an annular coil of an insulated conductor, the axis of said coil being co-axial with said common longitudinal axis;
    said multi-section, co-planar plates each consist of a flat C shaped plate with a filler plate at the ends thereof, extending in a common flat plane, parallel to the said axis of said coil, at least one end of said C shaped plate being spaced from said filler plate to form an air gap, in cooperation with the other multi-section plates of said choke,
    and said plate and filler plate include interengaging tongues and grooves.

6. An electric lighting fitting as specified in claim 1 wherein
    said fitting having a shade at the lower end thereof,
    said annular upper housing is integral with said heat resistant encapsulation and both are formed of the same material, thereby constituting a single, unitary adapter between said terminal block means and the shade of said fitting.

7. An electric lighting fitting as specified in claim 1 wherein
    said upper housing, choke and encapsulation are an integral, one piece unit, said holes extend therethrough for detachably affixing said unit to said terminal block means and said lamp holder includes registering holes for detachably affixing the same to said terminal block means.

8. An electric light fitting as specified in claim 1 plus a saddle detachably clamped to said terminal block means, said saddle extending beyond said terminal block means in supporting engagement with said choke for retaining said choke on said terminal block means.

9. In a symmetrical, annular, electric lighting fitting the combination of terminal block means adapted to be affixed to a support;

a lamp holder in said fitting, electrically connected to said terminal block means;

an electric discharge lamp bulb detachably mounted in said lamp holder, said lamp, lamp holder and terminal block means having a common longitudinal axis;

an annular upper housing associated with said terminal block means, said housing encircling said common axis at a spaced lateral distance therefrom, proximate said lamp holder, and defining an annular space therearound for receiving a choke;

an annular choke electrically connected to said lamp holder, said choke being fitted in said annular space and having a plurality of multi-section, co-planar plates, each disposed substantially radially on said coil, the inner edges of said plates outlining a cylindrical figure encircling said common axis at a spaced distance therefrom;

and an annular, heat-resistant, encapsulation in intimate contact with the entire exterior of said choke, said encapsulation including an inner cylindrical wall covering the said inner edges of said plates for thermally isolating said choke from said lamp.

References Cited by the Examiner
UNITED STATES PATENTS

| | | | |
|---|---|---|---|
| 349,617 | 9/86 | Stanley | 336—83 X |
| 1,011,884 | 12/11 | Cavanagh | 315—283 X |
| 1,603,417 | 10/26 | Schaller et al. | 315—100 X |
| 1,770,891 | 7/30 | Weigand | 315—283 X |
| 2,161,853 | 6/39 | Comstock | 240—11.4 |
| 2,302,438 | 11/42 | Gaynor | 315—100 X |
| 2,484,215 | 10/49 | Foster | 336—219 X |
| 2,600,473 | 6/52 | Brockman | 336—219 |
| 2,664,541 | 12/53 | Henderson | 336—165 X |
| 2,696,593 | 12/54 | Dole | 336—83 |
| 2,878,425 | 3/59 | Keizo Kudoh | 240—11.4 X |
| 2,976,399 | 3/61 | Christy | 240—11.4 |
| 3,024,432 | 3/62 | Huck | 336—65 |
| 3,027,490 | 3/62 | Craig. | |
| 3,028,570 | 4/62 | Taylor | 336—83 |
| 3,029,403 | 4/62 | Krueger | 336—219 |
| 3,068,433 | 12/62 | Wroblewski et al. | 336—83 |

FOREIGN PATENTS

| | | |
|---|---|---|
| 699,478 | 11/53 | Great Britain. |
| 18 | 4/95 | Denmark. |

NORTON ANSHER, *Primary Examiner.*

LAWRENCE CHARLES, *Examiner.*